Jan. 2, 1962 H. C. KUNTZLEMAN ET AL 3,015,732

DELAYED COINCIDENCE CIRCUIT

Filed Dec. 23, 1957

INVENTORS
HARRY C. KUNTZLEMAN
JOHN G. SIMEK
BY John P. Dainty
ATTORNEY 3,015,732
DELAYED COINCIDENCE CIRCUIT
Harry C. Kuntzleman, Newark Valley, and John G. Simek, Endicott, N.Y., assignors to International Business Machines Corporation, New York, N.Y., a corporation of New York
Filed Dec. 23, 1957, Ser. No. 704,623
8 Claims. (Cl. 307—88)

The invention relates to digital control circuits and more particularly to circuits of the type capable of providing an output pulse at a time delayed from the time of application of an input pulse.

Single shot, or monostable, multivibrators have been used as delay elements. Here an input pulse triggers the single shot multivibrator "on" and after a time determined by the time constant of the cross coupling the device turns "off," i.e., resumes the original condition of conduction. The turning "off" of the device may be used to produce the delayed pulse, or a pulse in coincidence with the output of the device while "on" may provide the delayed pulse. Such devices are unsuited to many applications such as where the time delay must be in relation to timing pulses and not in relation to absolute time.

An object of the present invention is to provide an improved delay device.

Another object is to provide an improved delayed coincidence circuit.

Another object is to provide an improved circuit wherein an input pulse is delayed in time for multiple applications to a coincidence circuit.

Still another object is to provide an improved delay device wherein the delay is in relation to timing pulses rather than in relation to absolute time.

Another object is to provide an improved delayed coincidence circuit wherein an output pulse may be produced at any of a number of delayed time increments.

According to a preferred embodiment of the present invention a saturable magnetic core having substantial retentivity is set in a predetermined state of retained flux density by an input pulse. Timing pulses are then applied to the core to incrementally raise the flux density in the core in step by step fashion toward a particular direction of saturation. Before the core reaches saturation an output pulse is produced for each timing pulse. However, after saturation is reached no further output pulses are produced until another input pulse is applied. The output is fed to a coincidence circuit to which is also applied a second input pulse. Thus, an output is obtained from the coincidence circuit only if the second input pulse is applied thereto within a predetermined number of timing pulses after the application of the input pulse to the core.

While the preferred embodiment of this invention makes use of the retentive properties of magnetic materials, it is well known that non-linear ferroelectric condensers have analogous properties in that their charge voltage curve resembles the B-H curve for the magnetic materials.

Other objects of the invention will be pointed out in the following description and claims and illustrated in the accompanying drawings, which disclose, by way of examples, the principle of the invention and the best mode, which has been contemplated, of applying that principle.

Figure 1:
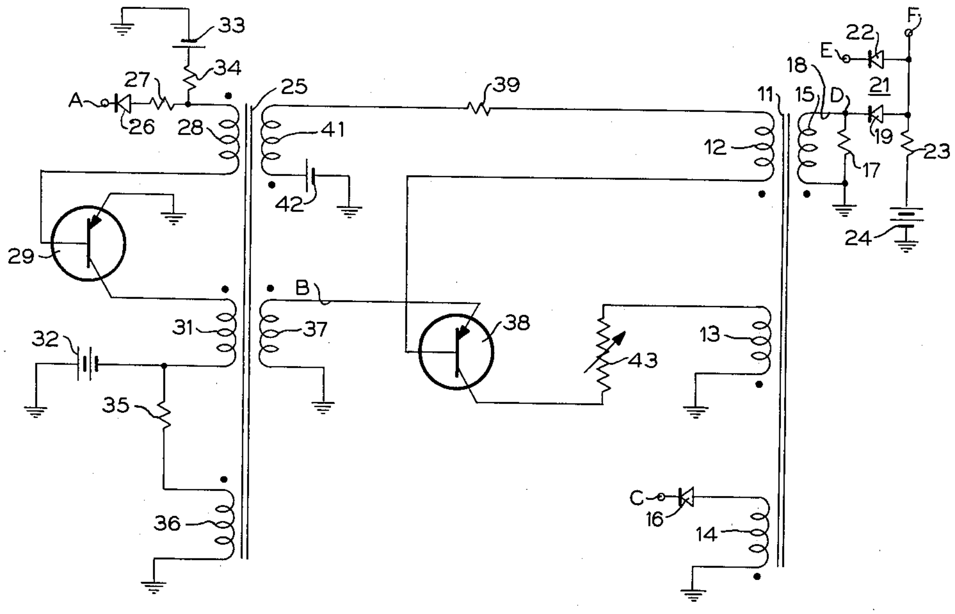
FIG. 1 is a schematic circuit diagram of a delayed coincidence circuit constructed in accordance with the present invention.

Referring to FIG. 1, there is shown diagrammatically a saturable toroidal core 11. This core 11 is made of a material having a substantial retentivity, that is, when driven in one direction by current through a winding thereon, the core retains a substantial amount of the flux induced therein. Also, when driven in the opposite direction, the core retains a substantial portion of a flux induced in the opposite direction. The number of turns about the core, the direction of the turns, the current flowing through these turns, the material of which the core is made, the length of time that the current flows and the physical dimensions of the circuit determine the amount of residual flux retained in the core. The core may be saturated in either of two directions or may be driven to any intermediate point between these two levels of saturation. Satisfactory materials having a substantial retentivity are well known in the art. Core 11 has three primary input windings, 12, 13 and 14, and a single output secondary winding 15. A negative-going pulse applied at point C through diode 16 to winding 14 sets or drives core 11 to saturation in a first direction. Pulses applied through winding 13 drive the core in the opposite direction and if a sufficient number of pulses are applied to winding 13, core 11 will be driven to saturation in this opposite direction.

Once core 11 has been driven to saturation in the first direction by a negative-going pulse applied to winding 14, timing pulses thereafter applied to winding 13 will drive core 11 in step by step fashion in the opposite direction, and, until the opposite direction of saturation is reached, each pulse applied through winding 13 will cause an output pulse to appear across winding 15. The pulse appears across winding 15 by virtue of the fact that a change of flux is induced in core 11 upon the occurrence of each timing pulse until such time as core 11 reaches saturation. The voltage induced in winding 15 and appearing on line 18 is shown at D in FIG. 2. Line 18 is connected to diode 19, which diode 19 forms part of an "AND" circuit 21. "AND" circuit 21 is made up of diode 19, diode 22, resistor 23, and a source of potential 24. When positive voltages are simultaneously applied on line 18 and on terminal E an output is produced from "AND" circuit 21 at terminal F. The operation is such that with a relatively negative potential level at the cathode of either diode 19 or diode 22, the respective diode conducts to maintain the potential at point F at a relatively negative level. However, if a positive voltage is applied to both line 18 and terminal E, the voltage at point F rises since conduction is cut off or greatly reduced through diodes 19 and 22. The supply 24 provides the biasing to produce this positive output potential.

Figure 2:
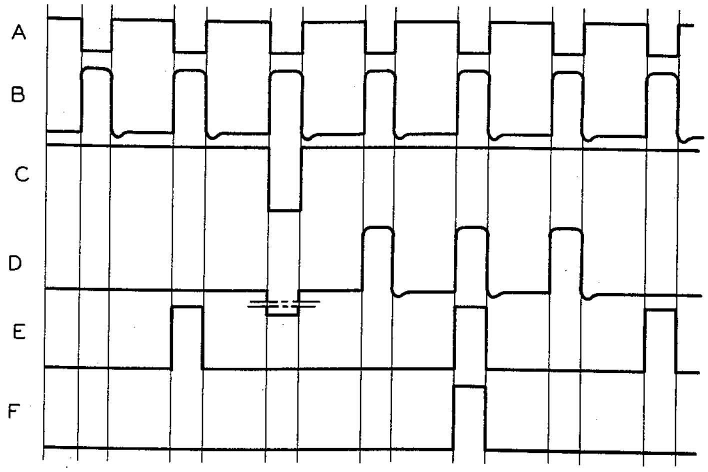
FIG. 2 shows diagrammatically waveforms, to a common time base, occurring at various points throughout the circuit of FIG. 1.

It may thus be seen that if a negative-going pulse, shown at C in FIG. 2 is applied to winding 14, there will appear on line 18 a positive-going voltage thereafter each time a pulse is applied to winding 13 until core 11 reaches saturation. Consequently, a positive-going pulse applied to terminal E before core 11 reaches saturation in time with the timing pulses will form coincidence with a pulse on line 18, shown at D in FIG. 2, to produce a positive output at terminal F. This output is shown at F in FIG. 2.

Referring now to core 25 in FIG. 1 there is shown a circuit for quantizing pulses appearing at terminal A. These pulses at terminal A are time spaced timing pulses and the purpose of the circuit around core 25 is to quantize these timing pulses, that is, to accurately shape these pulses both in time duration and in amplitude. Pulses appearing on terminal A are applied through diode 26 and resistor 27 and to one end of winding 28. The other end of winding 28 is connected to the base of a PNP type transistor 29. The collector of transistor 29 is tied through winding 31 to a source of potential 32. The emitter of transistor 29 is tied to ground. A source of potential 33 acting through resistor 34 and winding 28 normally biases the base of transistor 29 in a positive manner to thus maintain transistor 29 cut off. When, however, a negative-going timing pulse is applied to terminal A through diode 26, resistor 27 and winding 28, the base of transistor 29 is driven in a negative direction to cause transistor 29 to conduct. The electron flow is then from the negative terminal of source 32 through winding 31 and through transistor 29. This circuit with winding 28 and core 25 acts as a blocking oscillator. When the positive bias on the base of transistor 29 is overcome by a negative-going timing pulse, the current flowing through winding 31 induces a voltage in winding 28 which acts to apply a negative potential to the base of transistor 29 to maintain transistor 29 in its conductive state. This negative potential will continue to be applied to the base of transistor 29 until the core 25 reaches saturation at which time no further voltage will be induced in winding 28 and transistor 29 may cut off. When transistor 29 cuts off, electrons will flow from the negative terminal of source 32 through resistor 35 and through winding 36 to ground to thus saturate core 25 in the opposite direction. As transistor 29 begins to conduct, the current flowing through winding 31 induces a voltage in winding 37 in such a direction as to raise the potential on line B. Since the magnitude of the voltage induced in winding 37 is dependent on the rate of change of flux in core 25, the voltage across winding 37, and thus the voltage on line B, will return to its normal level when core 25 reaches saturation. The triggering of transistor 29 "on" and the maintenance of a current flow in transistor 29 until core 25 saturates causes output pulses on line B, shown at B in FIG. 2, to be of a uniform time duration of a uniform amplitude. Should the input timing pulses be of longer duration than the time required to saturate core 25, the duration of the output pulses on line B will not be affected since the output pulses are terminated upon the saturation of core 25. Core 25 will be reset when the negative-going pulse at point A is removed. The reset is provided by the source 32 acting through resistor 35 and winding 36. Once the current flowing through winding 31 ceases the current flowing through winding 36 is effected to saturate core 25 in the opposite direction.

Line B is connected to the emitter of a PNP type transistor 38. Transistor 38 has its base connected through winding 12 and a resistor 39 to one end of a secondary winding 41 on core 25. The opposite end of winding 41 is connected to a source of potential 42 so that source 42 provides a positive bias on the base of transistor 38 except when a negative-going timing pulse is applied to terminal A. When a negative-going timing pulse is applied to terminal A, winding 41 develops a negative-going voltage which is applied through winding 12 to the base of transistor 38 to then cause transistor 38 to go into a conductive state. Simultaneous with the application of the negative-going pulse to the base of transistor 38, the positive pulse on line B is applied to its emitter. Thus, transistor 38 will conduct electrons from ground through winding 13, through an adjustable resistor 43 and through transistor 38 to the line B now at a positive potential level. Resistor 43 may be varied in order to vary the amount of current supplied through winding 13. Thus, by adjusting resistor 43, the number of timing pulses required to saturate core 11 may be controlled. This number might be, for example, 3, 4 or any other number desired.

To summarize, it may be seen that timing pulses applied to terminal A are fed through a quantizing circuit and then fed through variable resistor 43 to winding 13. Each timing pulse applied through winding 13 drives core 11 in one direction by an amount determined by the setting of resistor 43. Thus the application of a number of timing pulses to winding 13 determined by resistor 43 will drive core 11 to saturation in one direction. A pulse applied to terminal C will drive core 11 to saturation in the opposite direction. Once driven to saturation in this opposite direction, pulses applied through winding 13 will incrementally drive the core back in the other direction in a step by step fashion and upon the application of each timing pulse through winding 13, a pulse will appear across output winding 15 until such time as core 11 is driven to saturation. These output pulses across winding 15 and resistor 17 are applied to one side of "AND" circuit 21. The other side of "AND" circuit 21 has applied thereto the pulses from terminal E. Thus, when a pulse is applied at terminal C in one time increment, a pulse applied at terminal E at a later time increment will produce an output at terminal F, only if the pulse at E occurs within a predetermined number of timing pulses after the pulse at terminal C. It should be noted that the pulses applied to terminal E occur in time with timing pulses at terminal A. With this arrangement, a pulse at terminal C starts a delay time for a number of increments of time determined by the setting of resistor 43. Thus, at a later time, coincidence is formed with a pulse at terminal E to produce an output at terminal F indicating that a pulse occurred at terminal C within a predetermined number of timing pulses prior to the occurence of the output pulse at terminal F. The output appearing at terminal F thus depends on an input having been applied to terminal C at a predetermined time in relation to the timing pulses prior to the application of the pulse at terminal E. Since each state of the core 11 to which the core is driven by a pulse through winding 13 is a stable state, the delay time of the device is controlled only by the setting of resistor 43 and the number of pulses applied through winding 13. It should be noted that the timing pulses need not be accurately spaced and that the time between pulses may vary greatly. It is only necessary that a pulse at terminal E coincide in time with a timing pulse.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A delay device comprising in combination, an element having first and second stable saturation states and a plurality of stable states intermediate the two saturation states, means for setting said element in said first of said saturation states, means for incrementally urging said element through said plurality of intermediate stable states toward said second stable state, means responsive to each incremental urging before said element reaches said record saturation state for producing an output pulse, an "AND" circuit, means for applying said output pulses to one side of said "AND" circuit, and means for applying second pulses to the other side of said AND circuit, whereby an output will be produced from said "AND" circuit only if said second pulse occurs within a predetermined number of time increments after said element is set in said first state of saturation and before said element reaches its second stable state.

2. A delayed coincidence circuit comprising an element having first and second stable saturation states and a plurality of other stable states therebetween, means responsive to a first pulse for setting said element in said first stable saturation state, means for sequentially driving said element in successive time intervals through said plurality of other stable states to said second stable saturation state, means for producing a signal upon said element being driven to each of said other stable states, a coincidence circuit adapted to produce an output pulse upon coincidence of pulses applied thereto, means for applying said signal to said coincidence circuit, a source of second pulses, and means for applying said second pulses to said coincidence circuit whereby an output pulse is produced upon the occurrence of a second pulse within a predetermined number of time intervals after the occurrence of said first pulse and before said core reaches its second stable saturation state.

3. A delayed coincidence circuit comprising a magnetic core element having first and second stable states of magnetic saturation and a plurality of other stable states of remnant magnetization therebetween, winding means on said core, means for applying a first pulse to said winding means for setting said core in a first stable state of remnant magnetization, means for applying time spaced pulses to said winding means to successively drive said core increments of magnetization to saturation in said second stable state, output means coupled to said winding means for producing an output signal upon each change in magnetization produced by said time spaced pulses, a coincidence circuit adapted to produce an output pulse upon coincidence of signals applied thereto, means for applying said output signals to said coincidence circuit, a source of signals, and means for applying signals from said source to said coincidence circuit whereby an output pulse is produced upon the occurrence of a signal from said source within a predetermined number of timing pulses after the occurrence of said first pulse and before said core is magnetized to saturation in its second stable state.

4. A delayed coincidence circuit comprising a saturable magnetic core comprised of such material that the flux density thereof may be successively increased in step by step fashion in response to a series of time spaced pulses of magnetizing force, means including a primary winding on said core for resetting it to a given state of remnant magnetization in response to an input pulse, a source of time spaced pulses, means including a winding on said core responsive to pulses from said source for increasing the flux density of said core in step by step fashion to saturation, a secondary winding on said core for producing an output pulse upon each step by step change in flux density in said core, an "AND" circuit having a first input connected to said secondary winding, and a second input and adapted to produce an output signal upon coincidence of pulses on said first and second inputs, and means for applying pulses to said second input whereby an output signal is produced by the application of a pulse to said second input only if applied within a predetermined number of time spaced pulses after the occurrence of an input pulse and before said core is saturated.

5. A delayed device comprising a saturable magnetic core comprised of such material that the flux density thereof may be successively increased in step by step fashion, a source of time spaced pulses, means including a first primary winding on said core responsive to pulses from said source for increasing the flux density in said core in step by step fashion toward saturation, means including a second primary winding on said core for resetting it to a given state of remnant flux density in response to an input pulse to be delayed, a secondary winding on said core for producing an output pulse upon each step by step change in flux density in said core, and switching means connected to said secondary winding manifesting a delayed pulse in response to said input pulse.

6. Apparatus according to claim 5 wherein said switching means includes a source of switching pulses in time with said time spaced pulses.

7. A delayed coincidence circuit comprising a multistable magnetic core element, winding means on said core element, means for applying a first pulse to said winding means for setting said core in a first state of remnant magnetization, a source of time spaced pulses, means for applying said time spaced pulses to said winding means to successively drive said core in increments of magnetization toward saturation, adjustable impedance means in said means for applying said time spaced pulses to said winding means whereby the number of timed spaced pulses required to drive said core to saturation may be varied, output means coupled to said winding means for producing output signals upon changes in magnetization produced by said time spaced pulses, an "AND" circuit having first and second inputs and an output, means for applying said output signals to said first input, and a source of signals connected to said second input whereby an output pulse is produced at the output of said "AND" circuit by a signal from said source occurring within a predetermined number of said time spaced pulses after said first pulse.

8. A delayed coincidence circuit comprising a multistable magnetic core element, winding means on said core element, means for applying a first pulse to said winding means for setting said core in a first state of remnant magnetization, a source of time spaced pulses, said source of time spaced pulses including quantizing means whereby said time spaced pulses are uniformly shaped in amplitude and time duration, means for applying said time spaced pulses to said winding means to successively drive said core in increments of magnetization toward saturation, adjustable impedance means in said means for applying said time spaced pulses to said winding means whereby the number of time spaced pulses required to drive said core to saturation may be varied, output means coupled to said winding means for producing output signals upon changes in magnetization produced by said time spaced pulses, an "AND" circuit having first and second inputs and an output, means for applying said output signals to said first input, and a source of signals connected to said second input whereby an output pulse is produced at the output of said "AND" circuit by a signal from said source occurring within a predetermined number of said time spaced pulses after said first pulse.

References Cited in the file of this patent

UNITED STATES PATENTS

| | | |
|---|---|---|
| 2,792,506 | Torrey | May 14, 1957 |
| 2,808,578 | Goodell | Oct. 1, 1957 |
| 2,857,586 | Wylen | Oct. 21, 1958 |
| 2,876,438 | Jones | Mar. 3, 1959 |
| 2,910,594 | Bauer et al. | Oct. 27, 1959 |